United States Patent
Amos et al.

(10) Patent No.: US 11,367,952 B2
(45) Date of Patent: Jun. 21, 2022

(54) METHOD AND SYSTEM FOR ALIGNING AN EARTH STATION ANTENNA WITH A SATELLITE ANTENNA

(71) Applicant: EUTELSAT S A, Paris (FR)

(72) Inventors: Sonya Amos, Paris (FR); Hector Fenech, Issy les Moulineaux (FR); Mark Rawlins, Méré (FR)

(73) Assignee: EUTELSAT S A, Issy les Moulineaux (FR)

( * ) Notice: Subject to any disclaimer, the term of this patent is extended or adjusted under 35 U.S.C. 154(b) by 254 days.

(21) Appl. No.: 16/492,456

(22) PCT Filed: Mar. 8, 2018

(86) PCT No.: PCT/EP2018/055745
§ 371 (c)(1),
(2) Date: Sep. 9, 2019

(87) PCT Pub. No.: WO2018/162635
PCT Pub. Date: Sep. 13, 2018

(65) Prior Publication Data
US 2021/0218140 A1    Jul. 15, 2021

(30) Foreign Application Priority Data
Mar. 10, 2017  (EP) .................................. 17160355

(51) Int. Cl.
*H01Q 3/08* (2006.01)
*H04B 17/309* (2015.01)
*G01S 3/38* (2006.01)
*H01Q 1/12* (2006.01)
*H04B 7/185* (2006.01)

(52) U.S. Cl.
CPC ................. *H01Q 3/08* (2013.01); *G01S 3/38* (2013.01); *H01Q 1/1257* (2013.01); *H04B 7/18517* (2013.01); *H04B 17/309* (2015.01)

(58) Field of Classification Search
CPC ...... H01Q 3/08; H01Q 1/1257; H04B 17/309; H04B 7/18517; G01S 3/38
USPC .......................................... 342/352; 343/756
See application file for complete search history.

(56) References Cited

U.S. PATENT DOCUMENTS

| | | | | |
|---|---|---|---|---|
| 6,157,817 A | * | 12/2000 | Norin ..................... | H01Q 3/267 455/12.1 |
| 6,317,093 B1 | * | 11/2001 | Harris ................... | H01Q 1/1257 343/765 |
| 2014/0022120 A1 | | 1/2014 | Mendelsohn et al. | |

FOREIGN PATENT DOCUMENTS

EP    1 303 002 A1    4/2003

OTHER PUBLICATIONS

International Search Report as issued in International Patent Application No. PCT/EP2018/055745, dated May 11, 2018.

\* cited by examiner

*Primary Examiner* — Bo Fan
(74) *Attorney, Agent, or Firm* — Pillsbury Winthrop Shaw Pittman LLP

(57) ABSTRACT

A method for aligning an earth station antenna with a satellite antenna includes sending an uplink signal from the earth station antenna to the satellite antenna; measuring at least a strength of the uplink signal received by the satellite antenna; sending by telemetry the measured signal strength to a telemetry station; adjusting the orientation of the earth station antenna in order to maximize the measured signal strength.

13 Claims, 2 Drawing Sheets

METHOD AND SYSTEM FOR ALIGNING AN EARTH STATION ANTENNA WITH A SATELLITE ANTENNA

CROSS REFERENCE TO RELATED APPLICATIONS

This application is the U.S. National Stage of PCT/EP2018/055745, filed Mar. 8, 2018, which in turn claims priority to European Patent Application No. 17160355.8 filed Mar. 10, 2017, the entire contents of all applications are incorporated herein by reference in their entireties.

TECHNICAL FIELD

The present invention relates to a method and system for aligning an earth station antenna with a satellite antenna.

BACKGROUND

Operators of earth stations need to ensure that the earth station antenna is well aligned with the satellite antenna, both in pointing and polarization, in order to establish and maintain a high quality communication between the earth station and the satellite and in order to minimize interference with the neighboring satellites.

Consequently, the earth station antenna must both be pointed correctly at the satellite antenna and, in case of polarization, it must also be oriented about its axis to maximize reception of the linearly polarized signals. This process of correctly pointing and orienting the earth station antenna with respect to the satellite antenna is called "line-up".

The Pre-Transmission Line-Up (PTLU) test assures that the assigned satellite frequency, power level and polarization, as defined by the satellite operator, is respected.

The PTLU test ensures that the polarization of the antenna meets or exceeds thresholds for the type of service and that the power level transmitted by the Earth station and the power received from the satellite match expectations in order to verify that the antenna is well pointed to the satellite.

Line-up methods of the prior art rely on the fact that a communications system control center, or satellite operations center, has measurement facilities connecting it within the downlink service area of the satellite in order to measure the signal emitted from the satellite. However, it is not always possible to have access to the signal emitted from the satellite.

The satellite operator deploys a number of monitoring stations where each separate monitoring facility is required in each geographical area served by the satellite, at least one station per coverage zone.

The prior art solutions cater for environments where limited and relatively large satellite coverages are employed that change little over time.

In addition, such solutions are based upon land based facilities. When the satellite coverages do not cover any landmass, no current solution exists where a monitoring station can be permanently located at sea.

SUMMARY OF THE INVENTION

The current invention aims at providing a line-up method and system allowing line-ups to be performed without having access to the downlink signals emitted by the satellite.

The solution is independent of geographical downlink coverage.

The solution is not dependent on being able to establish monitoring stations in inconvenient or dangerous environments, at sea for example.

A single monitoring solution on the satellite can replace multiple land based monitoring sites.

This satellite monitoring solution utilizes the ability of the system to identify the location of a signal arriving at the satellite as part of the line-up procedure and therefore discriminate it from other potential signals at the same frequency.

To that purpose, the invention proposes to measure signal parameters on the uplink path and to transmit these measured parameters by telemetry to an earth station. This enhances the accuracy since the only signal involved is the uplink signal. The measurement is performed at the satellite without incurring inaccuracies added due to the downlink signal path.

More precisely, an aspect of the invention concerns a method for aligning an earth station antenna with a satellite antenna, the method comprising the following steps:
 (a) sending an uplink signal from the earth station antenna to the satellite antenna;
 (b) measuring at least a strength of the uplink signal received by the satellite antenna;
 (c) sending by telemetry the measured strength to a telemetry station;
 (d) adjusting an orientation of the earth station antenna in order to maximize the measured strength.

Measurements are made on the spacecraft and these measurements are sent to Earth via the spacecraft telemetry. Telemetry links are low bit rate links (i.e. relatively low amount of data over time, typically few kilobits per second) that enable satellites to send results of measurements, information concerning satellite operation, the operation of equipment and verification of the execution of commands to the ground. Using this link therefore enables information of the signal received by the satellite antenna to be sent back to ground in an efficient manner without impacting the normal operation of the satellite.

The method also enables an efficient use of spacecraft resources in that the satellite solution utilizes recent advancements in geolocation technology such as a system described in the document "ELSA+: A step forward towards active antennas in flexible telecom payloads" (Montesano et al.—$3^{rd}$ ESA Workshop on Advanced Flexible Telecom Payloads—22-25 Mar. 2016). Geolocation is the process whereby the geographical location of the signal source can be determined. The method uses hardware nominally provided for a geolocation situation without need for further complexity of the spacecraft or additional resources. The fact that the process of the invention requires no additional hardware beyond the geolocation function is a key aspect in telecommunication satellites. It incurs no additional penalties with respect to mass, complexity or overall cost/lifetime of the spacecraft.

The method is not limited to use with geolocation facilities and can be provided as a separate function.

The method may also comprise one or several of the following features taken individually or according to all possible combinations.

The method comprises a first step of prepositioning the earth station antenna with respect to the satellite antenna. This first step of prepositioning is approximate.

Advantageously, during step (b) of measuring at least the strength of the uplink signal, the EIRP of the uplink signal transmitted from the ground is received by a sensing unit of the satellite.

Advantageously, the earth station antenna comprises an axis, step (d) of adjusting the orientation of the earth station antenna comprising a step of adjusting the axis of the earth station antenna in order to maximize the measured signal strength. This step enables to optimize the earth antenna pointing in order to maximize the signal strength.

According to one embodiment, the method further comprises the following steps:
measuring a first strength of the uplink signal received by the satellite antenna according to a first polarization plane;
measuring a second strength of the uplink signal received by the satellite antenna according to a second polarization plane.

The first polarization plane and the second polarization planes are orthogonal.

Advantageously, the method further comprises a step of sending by telemetry the first and the second measured signal strengths.

Advantageously, the method further comprises a step of adjusting an orientation of the earth station antenna about its axis in order to maximize the ratio between the first and the second measured strengths.

The above method applies in the case of both linear and circular polarizations.

In the case of linear polarization, the method additionally comprises:
a step of adjusting the angular position of the axis of the earth station antenna in order to maximize the measured signal strength on the required polarization plane whilst minimizing the signal strength on the opposite polarization. It is noted that this step could be performed via two separate steps;

In addition to the above embodiment in which the polarization plane is assumed to be the same and maximized, the system may also be applied in the case of aligning an earth station with a satellite with an arbitrary linear polarization system.

Another embodiment is, the step of adjusting the pointing of the earth station antenna comprises a step of automatically adjusting the position of the earth station antenna in order to maximize the measured strength.

The method of the invention may also be applied in the case of two collocated satellites or satellites in a similar orbital neighbouhood; in that case, a single satellite with such an embodiment would suffice for line-ups for both satellites. The method of the invention can be applied even if the two collocated satellites have different polarization planes.

Another aspect of the invention concerns a system for automatically aligning an earth station antenna with a satellite antenna, the system comprising:
an earth station antenna configured to send an uplink signal,
a sensing unit configured to measure at least the strength of the uplink signal sent by the earth station antenna and received by the satellite antenna;
a telemetry emitter configured to send by telemetry the measured signal strength to a telemetry station;
a telemetry station configured to receive the measured signal;
a control loop configured to adjust a position of the earth station antenna in order to maximize the measured signal strength.

The system according to the second aspect of the invention may also comprise one or several of the following features, taken individually or according to all possible technical combination.

Advantageously, the control loop comprises an actuator configured to adjust a position of the axis of the earth station antenna in order to maximize the measured signal strength.

Advantageously, the sensing unit is configured to measure:
a first strength of the uplink signal received by satellite antenna according to a first polarization plane;
a second strength of the uplink signal received by satellite antenna according to a second, orthogonal polarization plane.

The sensing unit preferably comprises antenna elements configured to measure the uplink signal strength (known in the industry as a field or power measurement).

Advantageously, the system further comprises a processor configured to deduce the ratio between the first and the second measured signal strengths.

Advantageously, the actuator is configured to adjust the orientation of the earth station antenna about its axis in order to maximize the ratio of the first and the second measured signal strengths.

Advantageously, the sensing unit and the telemetry emitter are mounted on board the satellite.

According to different embodiment:
the telemetry station may be mounted on the earth terminal; or
the telemetry station may be configured to be in communication with the earth station.

DETAILED DESCRIPTION

Figure 1:
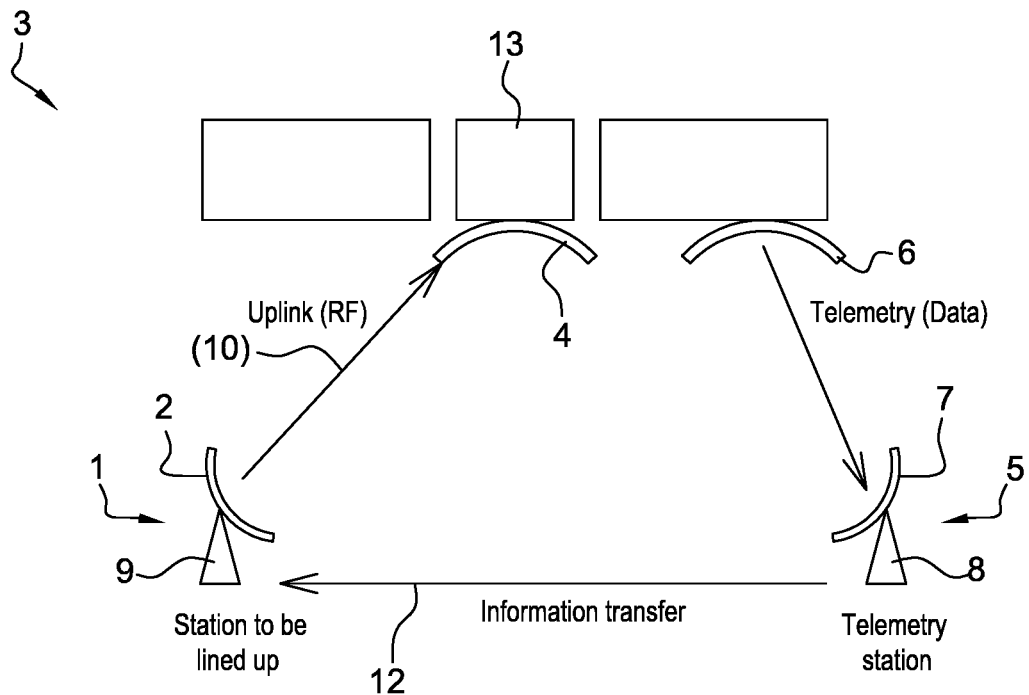
FIG. 1 schematically represents a system according to one embodiment of the invention.

FIG. 1 represents a system according to one embodiment of the invention. The system comprises an earth station 1 comprising an earth station antenna 2. The earth station antenna 2 comprises a first and second polarization planes. The first and the second polarization planes are preferably orthogonal.

The system further comprises a satellite 3. The satellite 3 comprises a satellite antenna 4. The satellite antenna 4 is preferably formed by an array of antenna elements 4. Each antenna element may be in the form of horn or patch as known in the industry. The satellite antenna 4 comprises a first and second polarization planes. The first and the second polarization planes are preferably orthogonal.

The satellite antenna 4 is combined with converting units 13 which convert the analogue received signal to a digital signal. The satellite antenna 4 and converting units 13 form a sensing unit. The sensing unit is configured to measure the signal strength of an uplink signal received by the satellite antenna 4. More precisely, the sensing unit is preferably configured to:

measure the strength of the uplink signal received by satellite antenna according to a first polarization plane. This strength is named "first measured strength";

measure the strength of the uplink signal received by satellite antenna according to a second polarization plane. This strength is named "second measured strength".

Figure 2:
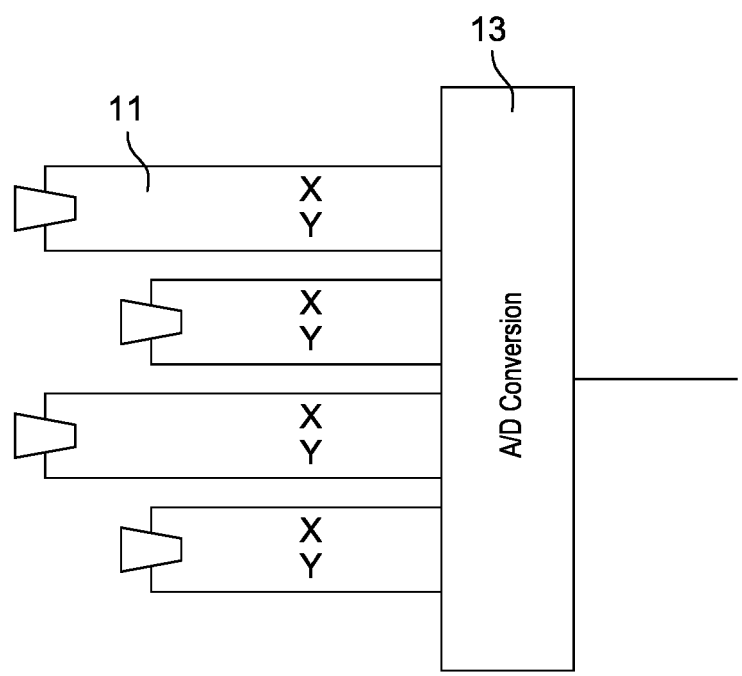
FIG. 2 schematically represents a sensing unit of the system of FIG. 1.
Figure 3:
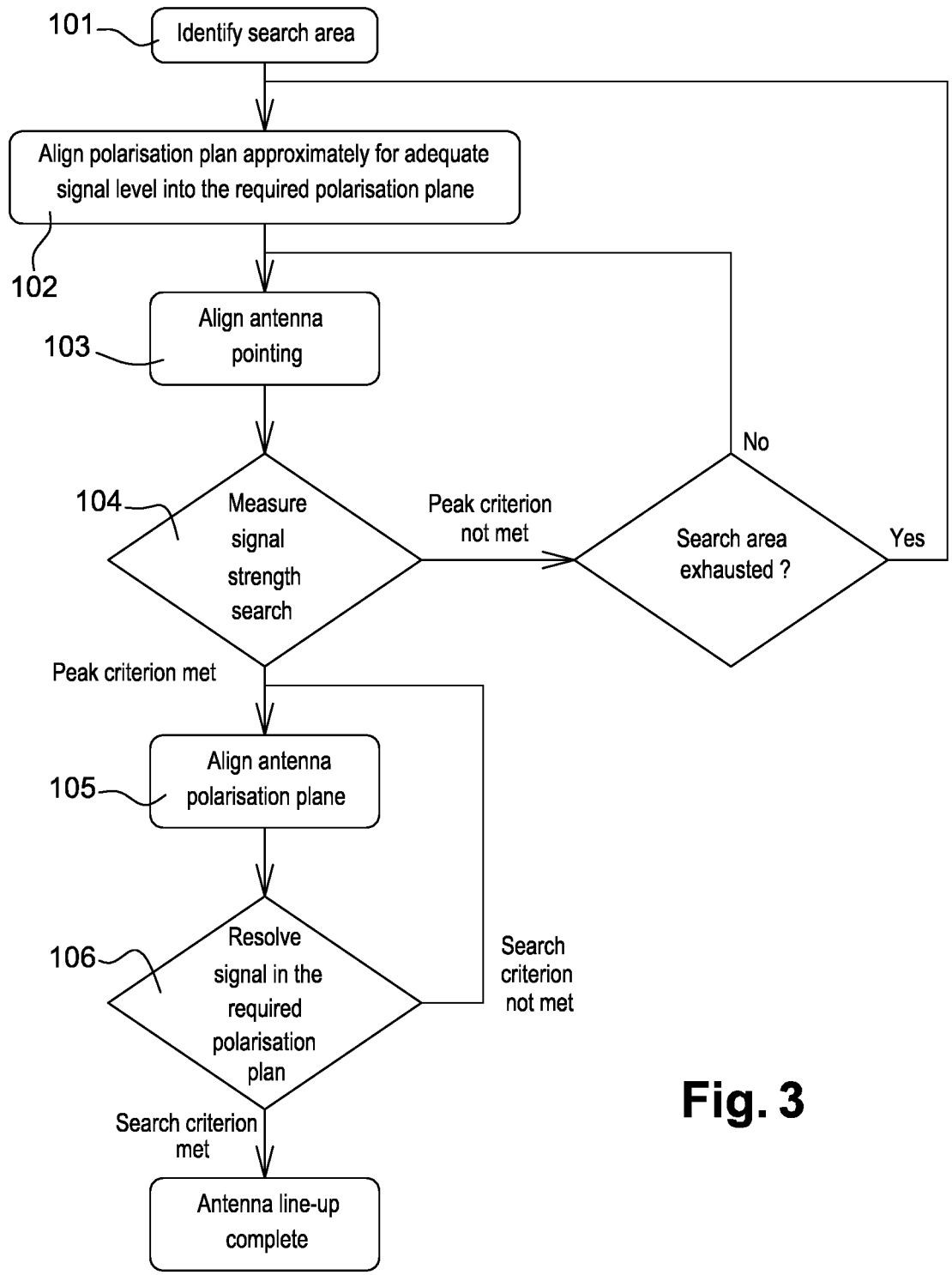
FIG. 3 schematically represents the steps of a method according to one embodiment of the invention.

To that purpose, as represented on FIG. 2, in case of orthogonal polarization, the sensing unit may comprise at least three, and preferably four, spatially separated antenna elements that are used with orthogonal polarisation ports 11. In providing spatially separated antenna elements, the system uses spatial diversity to increase the accuracy of the system. The increased number of antenna elements also increases the integrity of the system in case of failure. In order to process a signal and characterise its location, geolocation, a minimum of three independent signals are required. More feed arrangements could be included to improve the resilience of the system, resolution, redundancy etc. When the satellite antenna is an array antenna such as that in in the document "ELSA+: A step forward towards active antennas in flexible telecom payloads" (Montesano et al.—$3^{rd}$ ESA Workshop on Advanced Flexible Telecom Payloads—22-25 Mar. 2016), the sensing unit preferably comprises four antenna elements that are in the corners of the antenna array. These antenna elements provide little to the overall performance of the main function of the antenna so are utilised here for a different, additional purpose without impact and increasing the efficiency of the overall satellite resources. Four antenna elements provide eight measurement ports. The sensing unit can be used to measure the signal strength of the uplink signal at a given location and polarisation plane. During line-up, the intent is to ensure that the earth station is adequately pointed towards the satellite thus maximising the signal strength at the satellite in the appropriate polarisation and minimising its interference to other systems.

The satellite also comprises a telemetry emitter 6 configured to send the measured strength(s) to a telemetry station 5. The telemetry station 5 comprises a telemetry receiver 7 configured to receive the data sent by the telemetry emitter 6.

The system further comprises a processor 8 configured to deduce the ratio between the first and the second measured signal strengths. It is noted that this processing function could be performed on the satellite or on ground.

The system also comprises a control loop 12 configured to adjust the orientation of the earth station antenna 2 according to the measured signals strengths. The control loop 12 preferably comprises an actuator 9 configured to adjust the orientation of the earth station antenna 2 according to the measured signal strengths.

A method of line up the earth station antenna of the system of FIG. 1 will now be described with reference to FIG. 2.

The method may first comprise a step 101 of defining a search area.

The method comprises then a step 102 of prepositioning the earth station antenna 2 with respect to the satellite antenna 4. During this step 102, the axis of the earth station antenna 2 is approximately aligned with the axis of the satellite antenna 7. For a given earth station polarization, the polarization planes of the earth station antenna 2 is also approximately aligned with the polarization planes of the relevant satellite antenna 4. The polarization planes of the earth station antenna 2 to be lined up are adjusted using the best available knowledge or experience. In the case that the polarization planes of the earth station antenna 2 are widely out with respect to those of the satellite antenna 4, the signal strength is low and the line-up process becomes more difficult and more iteration is required, taking longer time.

The method comprises then a step 103 of adjusting the antenna pointing towards the satellite in azimuth and elevation as two separate processes.

The purpose of this step is to adjust the position of the axis of the earth station antenna with respect to the axis of the satellite antenna 4 in order to align the boresight of the earth station antenna to the satellite. The boresight of the earth station antenna is considered as aligned with the axis of the satellite when the measured strength is maximized.

During this step, several positions of the axis of the earth station antenna are tested.

For each tested position, the method comprises a step 103 of sending an uplink signal 10 from the earth station antenna 2 to the satellite antenna 4.

The method then comprises a step 104 of measuring the strength of the uplink signal 10 received by the satellite antenna.

Steps 103 and 104 are repeated until a peak criterion is met, i.e. until the uplink signal strength may not be improved by further adjustment.

The method then comprises a step 105 of aligning the polarization planes of the earth station antenna with respect to the polarization planes of the satellite antenna.

During this step, the earth station antenna is rotated about its axis.

For each tested position of the polarization planes of the earth station antenna, the method comprises a step of sending an uplink signal from the earth station antenna to the satellite antenna.

The method comprises:
a step of measuring the strength of the uplink signal received by the satellite antenna according to a first polarization plane. This strength is named "first measured signal strength";
a step of measuring the strength of the uplink signal received by the satellite antenna according to a second polarization plane. This strength is named "second measured signal strength".

The method comprises then a step of sending by telemetry the measured signal strengths to the telemetry station 5. To that purpose, the measured data are sent by telemetry from the telemetry emitter 6 to the telemetry receiver 7 of the telemetry station 5.

The method comprises a step of computing a ratio between the first and the second measured signal strengths. This step may be implemented on ground after the step of sending the measured strengths by telemetry or it could be implemented on-board the satellite and in this case, the ratio is sent by telemetry.

These steps are repeated until a search criterion is met. The search criterion is considered as met when the ratio between the first and the second measured strength is maximized.

More precisely, the orientation of the earth station antenna about its axis is adjusted until the search criterion is met. The search criterion is considered as met when an acceptable and known requirement is met or until the ratio between the measured signal strengths cannot be improved by further adjustments.

The earth station antenna is rotated about its axis until the polarization planes of the earth station antenna are aligned with the polarization planes of the satellite antenna.

The steps 103 and 105 of alignment are preferably performed by the control loop.

The proposed system and method provide the operator with the means to perform earth station line-ups without having access to the downlink signal and the ability to perform such line-ups for remote or hazardous/dangerous applications. Indeed the proposed system is independent of geographical coverage. Under these conditions, the required ground infrastructure is reduced or may be provided when there was previously no solution. The data is available via the telemetry facilities and consequently no dedicated earth station is required. In case of multiple downlink service areas, at least one earth station per service area is required. The solution therefore facilitates the line-up method and reduces the workload of the satellite operations center.

The method according to the invention is more accurate as it eliminates the impairment due to the downlink path. Additionally, the supervisory role of the satellite operations center is greatly simplified.

The system is capable of utilizing state of the art geolocation systems to perform the function such that no further hardware is required. This provides an efficient use of the resource. In the event of no geolocation unit on-board the satellite, the system can be provided by a separate unit.

Since both orthogonal polarizations are used, the first measured strength and the second measured strength can be used to deduce a true amplitude measurement which is independent of the polarization plane.

The method may also comprise a step of computing the amplitude of the uplink signal by using the first and the second measured strengths since the signals in both polarizations are known.

Thus, the accuracy of the earth station antenna pointing is independent of the initial phase alignment. This helps the process to converge more rapidly to the required accuracy of pointing. Additionally, if the location of the earth station is known, the geolocation data can be optimized over this area, or over a slightly larger area, to enhance the measurement accuracy. In advantageously using the geolocation data available from the common hardware, the data can be used. The geolocation data provides a snapshot of the signals captured at that frequency. The data is then used to spatially filter the signal from the station under test whilst suppressing any other unwanted signals.

Additionally the polarization alignment can be made to any polarization reference plane. Different satellite operators use different reference polarization planes. In addition different systems use linear or circular polarization. The proposed system is applicable to any polarization plane and polarization definition.

Moreover, the procedure according to the invention makes the pointing process and polarization plane alignment process independent and therefore reduces the iterative process and consequently time. Time is important for two reasons:

The time of line-up is the time of potential interference to adjacent satellites and cross-polar channels.

This time is the time it takes to bring the earth station into use. Additionally, it is the time taken by the engineer to perform that task. Both aspects have an economic bearing.

While the present invention has been particularly described with reference to the preferred embodiments, it should be readily apparent to those of ordinary skill in the art that changes and modifications in form and details may be made without departing from the scope of the invention. In particular, the invention has been described in the case where the measured data are directly sent to the telemetry station without being processed. However, the processing of the measured data could also be performed on board the satellite or on ground.

The invention claimed is:

1. Method for aligning an earth station antenna with a satellite antenna, the method comprising:
    (a) sending an uplink signal from the earth station antenna to the satellite antenna;
    (b) measuring at least a strength of the uplink signal received by the satellite antenna;
    (c) sending by telemetry the measured strength to a telemetry station, and
    (d) adjusting an orientation of the earth station antenna in order to maximize the measured strength.

2. The method according to claim 1, wherein the earth station antenna comprises an axis, step (d) of adjusting the orientation of the earth station antenna comprising adjusting the orientation of the axis of the earth station antenna in order to maximize the measured signal strength.

3. The method according to claim 1, further comprising the following steps for linear polarization:
    measuring a first strength of the uplink signal received by the satellite antenna according to a first polarization plane;
    measuring a second strength of the uplink signal received by the satellite antenna according to a second orthogonal polarization plane.

4. The method according to claim 3, further comprising sending by telemetry the first and the second measured signal strengths.

5. The method according to claim 4, further comprising adjusting an orientation of the earth station antenna about its axis in order to maximize the ratio between the first and the second measured signal strengths.

6. The method according to claim 1, further comprising calculating the amplitude of the uplink signal by using the first and the second measured signal strengths.

7. The method according to claim 1, further comprising prepositioning the earth station antenna with respect to the satellite antenna.

8. System for aligning an earth station antenna with a satellite antenna, the system comprising:
    an earth station antenna configured to send an uplink signal,
    a sensing unit configured to measure at least the strength of the uplink signal sent by the earth station antenna and received by the satellite antenna;
    a telemetry emitter configured to send by telemetry the measured signal strength to a telemetry station;
    a telemetry station configured to receive the measured signal strength, and
    a control loop configured to adjust a position of the earth station antenna in order to maximize the measured signal strength.

9. The system according to claim 8, wherein the control loop comprises an actuator configured to adjust a position of the axis of the earth station antenna in order to maximize the measured signal strength.

10. The system according to claim 8, wherein the sensing unit is further configured to measure:
    a first strength of the uplink signal received by satellite antenna according to a first polarization plane;
    a second strength of the uplink signal received by satellite antenna according to a second, orthogonal polarization plane.

11. The system according to claim 8, further comprising a processor configured to deduce the ratio between the first and second measured signal strengths.

12. The system according to claim 8, wherein the actuator is further configured to adjust the orientation of the earth station antenna about its axis in order to maximize the ratio of the first and second measured signal strengths.

13. The system according to claim 8, wherein the sensing unit and the telemetry emitter are mounted onboard the satellite.

* * * * *